L. W. THORP.
VEHICLE WHEEL.
APPLICATION FILED MAR. 6, 1916.

1,203,813.

Patented Nov. 7, 1916.
2 SHEETS—SHEET 1.

Witnesses

Inventor
L. W. Thorp.
By his Attorneys

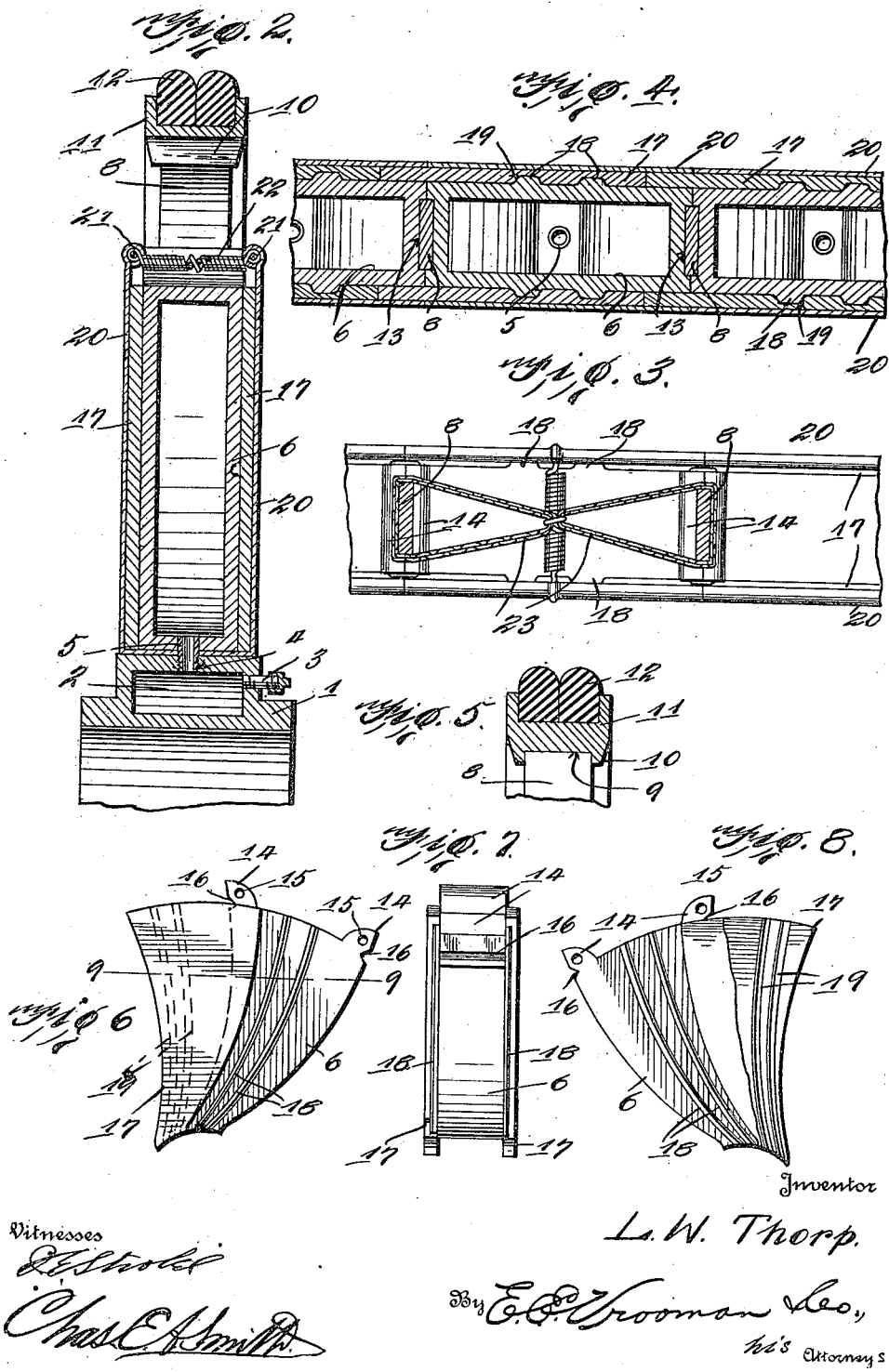

UNITED STATES PATENT OFFICE.

LEWIS W. THORP, OF SPRINGFIELD, MISSOURI.

VEHICLE-WHEEL.

1,203,813. Specification of Letters Patent. Patented Nov. 7, 1916.

Application filed March 6, 1916. Serial No. 82,436.

*To all whom it may concern:*

Be it known that I, LEWIS W. THORP, a citizen of the United States of America, residing at Springfield, in the county of Greene and State of Missouri, have invented certain new and useful Improvements in Vehicle-Wheels, of which the following is a specification, reference being had therein to the accompanying drawing.

This invention relates to vehicle wheels, and has for its object the production of a simple and efficient resilient wheel which will eliminate the necessity of employing a pneumatic tire.

Another object of this invention is the production of a simple and efficient means for producing a resilient wheel, whereby spring spokes may be used, and considerable of the pressure or resiliency of the spokes will be relieved by means of the pneumatic bags positioned between the spokes.

With these and other objects in view this invention consists of certain novel combinations, constructions, and arrangements of parts as will be hereinafter fully described and claimed.

Figure 1:
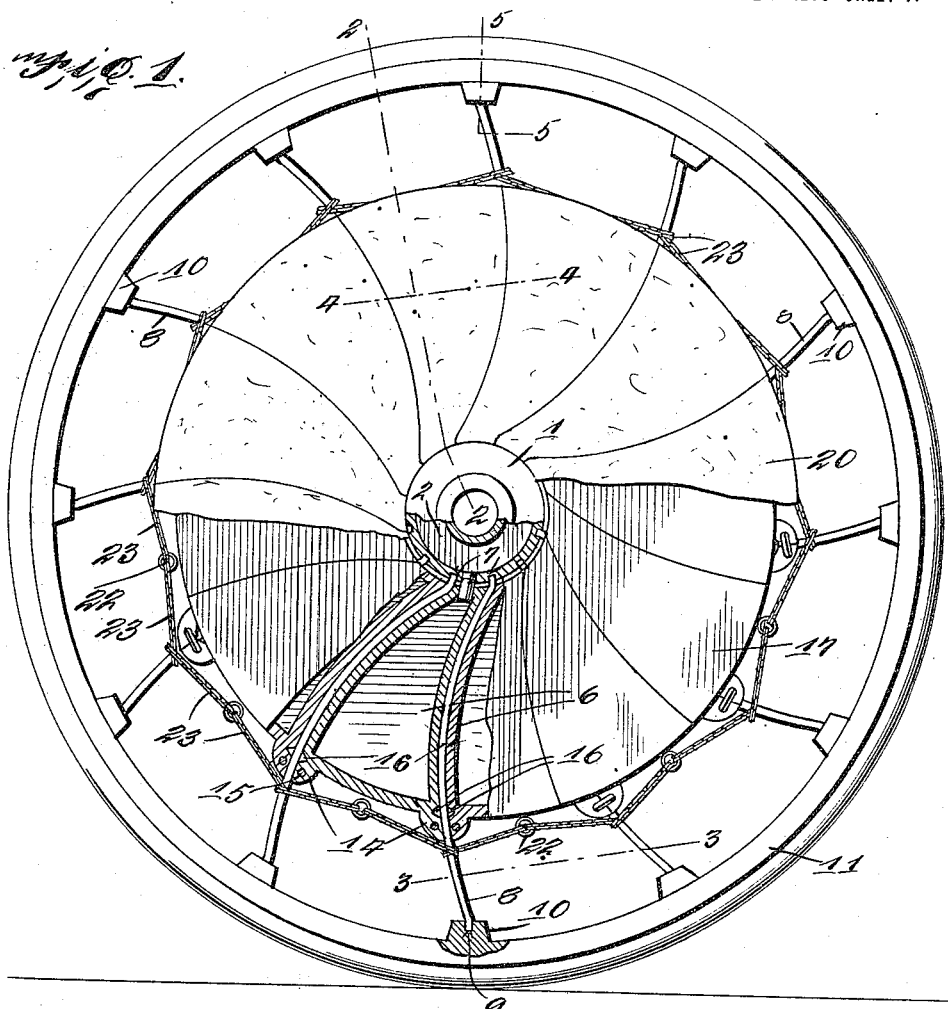
Figure 9:
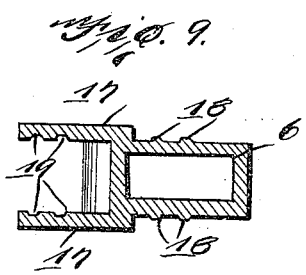
Figure 10:
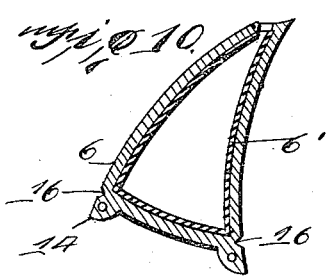

In the accompanying drawings:—Figure 1 is a side elevation of the wheel in accordance with the present invention partly shown in section. Fig. 2 is a section taken on line 2—2, of Fig. 1. Fig. 3 is a section taken on line 3—3, of Fig. 1. Fig. 4 is a section taken on line 4—4, of Fig. 1. Fig. 5 is a section taken on line 5—5, of Fig. 1. Fig. 6 is a side elevation of one of the pneumatic bags used in connection with the present invention. Fig. 7 is an edge view of one of the bags shown in Fig. 6. Fig. 8 is a view of the bag looking at the opposite side from that shown in Fig. 6. Fig. 9 is a section taken on line 9—9, of Fig. 6. Fig. 10 is a longitudinal section through a modified form of the pneumatic bag showing an inner tube placed therein.

By referring to the drawings it will be seen that 1 designates the hub which is provided with a hollow channel or compartment 2 formed therein, which channel 2 is provided with an air inlet valve 3 for the purpose of permitting air to be forced into the channel 2. The hub 1 is provided with a plurality of apertures or ports 4 formed around the periphery thereof and communicating with the channel portion 2, and these ports 4 receive the air inlet tubes 5 carried by the pneumatic bags 6. The pneumatic bags 6 are preferably formed of rubber and are substantially V-shaped, tapering from their outer toward their inner ends as illustrated in Fig. 1 of the drawings. The hub 1 is also provided with a plurality of sockets 7 upon the periphery thereof, which sockets are adapted to receive the inner ends of the spring spokes 8. The outer ends of the spring spokes 8 fit in the sockets 9 formed in the lugs 10 arranged upon the inner face of the rim 11 of the wheel. It, of course, should be understood that the rim 11 may be provided with a solid elastic or rubber tire 12 of any suitable construction without departing from the spirit of the invention.

The spring spokes 8 are bowed as illustrated in Fig. 1, and the elastic or pneumatic bags 6 are provided with grooves 13 formed upon the edges thereof for fitting snugly around the spring spokes 8 as illustrated clearly in Fig. 4 of the drawings. Each of the bags 6 is provided with a projecting rib or lug portion 14 upon the outer end thereof and near each side as clearly illustrated in Fig. 1 of the drawings, and these lug portions 14 are provided with apertures through which the tie loops 15 pass, which loops pass around the spokes 8 as illustrated in Fig. 1 of the drawings, and connect the lugs 14 of the adjoining bags firmly in engagement with the spring spokes 8. Notch portions 16 are formed upon the inner faces of the lugs 14 as illustrated in Fig. 1 for the purpose of permitting any accumulation to drop out through the notches 16 should any accumulation of dirt or other foreign substance work in between the spring spokes 8 and the side faces of the bags 6.

A plurality of side strips 17 are fitted upon the sides of the bags 6, and these strips 17 may be formed of any suitable material such as rubber and the like. The bags 6 are provided with a plurality of rib portions 18, which rib portions 18 are adapted to fit in the notches 19 of the side strips 17. The side strips 17 carried by one bag are adapted to overhang a portion of the adjoining bag as illustrated in Fig. 4 to constitute an overlapping joint and seal the joint between the respective bags.

A covering 20 is passed over the side strips 17 as illustrated in Fig. 2, and is preferably formed of flexible material such as leather or the like although, of course, it may be formed of any suitable or desired material without departing from the spirit of the invention. The covering sections 20 are formed in segments, and are adapted to fit snugly together as illustrated in Fig. 1, and these segments are provided upon the outer ends thereof with reinforcing rods 21, and transversely extending coil springs 22 engage the opposite rods 21 as illustrated in Fig. 2. Retaining chains 23 engage the springs 22 centrally thereof and are secured to the opposite spokes 8 as clearly illustrated in Fig. 1 of the drawings. It will, therefore, be seen that the coil springs 22 will constitute an efficient means for holding the covering 20 firmly upon the segments of the pneumatic tubes. It, of course, should be understood that the pneumatic tubes or bags 6 may have a free compressing action independent of the side strips 17, which strips 17 are adapted to prevent the bags from bulging laterally.

As illustrated clearly in Fig. 10 the pneumatic or rubber bags 6 may be provided with an inner tube 6' should it be so desired, which may be connected to the filling tube or pipe 5 in order to inflate the bags 6.

Having thus described the invention what is claimed as new, is:—

1. A wheel of the class described comprising a hub, a rim, resilient spokes interposed between said hub and rim, said hub provided with an inflating channel, a plurality of inflatable bags communicating with said channel and interposed between said resilient spokes.

2. A wheel of the class described comprising a hub, a rim, resilient spokes interposed between said hub and rim, said hub provided with an inflating channel, a plurality of inflatable bags communicating with said channel and interposed between said resilient spokes, and side strips carried by the sides of said inflatable bags for preventing the same from bulging laterally while being compressed.

3. A wheel of the class described comprising a hub, a rim, resilient spokes interposed between said hub and rim, said hub provided with an inflating channel, a plurality of inflatable bags communicating with said channel and interposed between said resilient spokes, side strips carried by the sides of said inflatable bags for preventing the same from bulging laterally while being compressed, and means for anchoring said bags in engagement with said spring spokes.

4. A resilient wheel of the class described comprising a hub, a rim, spring spokes interposed between said rim and hub, a plurality of pneumatic bags interposed between said spokes, each bag provided with a channel portion upon each edge for constituting a socket for said spokes, means for forming a communication between said pneumatic bags and hub, said hub provided with an air channel, each bag provided with a projecting lug upon the outer end thereof and near each side, means passing through the lugs of the adjoining bags and straddling said resilient spokes for anchoring said bags in engagement with said spokes.

5. A resilient wheel of the class described comprising a hub, a rim, spring spokes interposed between said rim and hub, a plurality of pneumatic bags interposed between said spokes, each bag provided with a channel portion upon each edge for constituting a socket for said spokes, means for forming a communication between said pneumatic bags and hub, said hub provided with an air channel, each bag provided with a projecting lug upon the outer end thereof and near each side, means passing through the lugs of the adjoining bags and straddling said resilient spokes for anchoring said bags in engagement with said spokes, and protector means fitting upon the sides of said inflatable bags for preventing the same from bulging outwardly.

6. A wheel of the class described comprising a hub, a rim, spring spokes interposed between said hub and rim, pneumatic bags interposed between said spokes, side strips fitting upon the sides of said bags, interlocking means formed upon said bags and side strips, a covering fitting over said reinforcing plates, and means for connecting the opposite sides of said covering together.

7. A wheel of the class described comprising a hub, a rim, spring spokes interposed between said hub and rim, pneumatic bags interposed between said spokes, side strips fitting upon the sides of said bags, locking means formed upon said bags and side strips, a covering fitting over said reinforcing plates, a transversely extending spring connecting the outer ends of said covering, and flexible means secured to said spring and passing over the adjoining spring spokes.

8. A resilient wheel of the class described comprising a hub, a rim, a plurality of spring spokes interposed between said hub and rim, resilient bags interposed between said spokes, said bags provided with longitudinally extending ribs upon the sides thereof, side strips carried by said bags and provided with grooves for receiving said ribs of said bags, the side strips of one bag overhanging a portion of the adjoining bag for constituting a seal for the joint between said bags, means for facilitating the inflation of said bags, a covering fitting over said plates, and means for yieldably holding said covering snugly in engagement with said side strips.

In testimony whereof I hereunto affix my signature.

LEWIS W. THORP.